US008333862B2

(12) United States Patent
Thompson et al.

(10) Patent No.: US 8,333,862 B2
(45) Date of Patent: Dec. 18, 2012

(54) SELF FIXTURING ASSEMBLY TECHNIQUES (75) Inventors: Peter M. Thompson, San Jose, CA (US); Martin Adamcyk, Belmont, CA (US); Timothy G. Van Vorhis, Elk Grove, CA (US); Arthur J. Lucchesi, San Jose, CA (US); Thomas A. Moore, Cupertino, CA (US); Matthew B. Morris, Alapaha, GA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 12/580,881

(22) Filed: Oct. 16, 2009

(65) Prior Publication Data
US 2011/0088838 A1    Apr. 21, 2011

(51) Int. Cl.
*B29C 65/14*    (2006.01)
(52) U.S. Cl. ............... 156/273.7; 156/273.3; 29/592.1; 361/679.01; 312/223.1; 349/58
(58) Field of Classification Search ............. 156/273.3, 156/273.7; 428/116, 117; 29/592.1; 361/679.01; 312/223.1; 349/58
See application file for complete search history.

(56) References Cited

U.S. PATENT DOCUMENTS

| 2,964,887 | A | | 12/1960 | Orozco |
| 3,517,466 | A | | 6/1970 | Bouvier |
| 4,766,746 | A | | 8/1988 | Henderson et al. |
| 5,221,397 | A | * | 6/1993 | Nystrom ............... 156/273.5 |
| 5,237,486 | A | | 8/1993 | LaPointe et al. |
| 5,531,950 | A | | 7/1996 | Kimura et al. |
| 5,572,244 | A | * | 11/1996 | Drake et al. .................. 347/42 |
| 5,606,438 | A | | 2/1997 | Margalit et al. |
| 5,611,517 | A | | 3/1997 | Saadi et al. |
| 5,795,430 | A | | 8/1998 | Beeteson et al. |
| 5,828,341 | A | | 10/1998 | Delamater |
| 5,881,103 | A | | 3/1999 | Wong et al. |
| 6,014,080 | A | | 1/2000 | Layson, Jr. |
| 6,122,167 | A | | 9/2000 | Smith et al. |
| 6,151,012 | A | | 11/2000 | Bullister |
| 6,179,122 | B1 | | 1/2001 | Moncrief et al. |
| 6,225,586 | B1 | * | 5/2001 | Watanabe et al. ............. 200/344 |
| 6,532,152 | B1 | | 3/2003 | White et al. |
| 6,542,384 | B1 | | 4/2003 | Radu et al. |
| 6,791,465 | B2 | | 9/2004 | Blagin et al. |
| 6,846,228 | B2 | | 1/2005 | Lin |
| 6,853,336 | B2 | | 2/2005 | Asano et al. |

(Continued)

FOREIGN PATENT DOCUMENTS
EP    0 683 026 B1    3/2001
(Continued)

OTHER PUBLICATIONS

English Abstract of JP 62035107 A, printed Jan. 11, 2011.*

(Continued)

*Primary Examiner* — Richard Crispino
*Assistant Examiner* — Elizabeth Royston (57) ABSTRACT

A process, apparatus, and system for joining at least two work pieces together using at least two adhesives each having substantially different cure times. A first adhesive having a first cure time is used to form a first bond between the two workpieces, the first adhesive having a first cure time. A second adhesive having a second cure time, the second cure time being substantially shorter than the first cure time is used to form a fixturing bond. The fixturing bond maintaining the first and second workpieces in position prior to the first adhesive curing.

9 Claims, 7 Drawing Sheets

U.S. PATENT DOCUMENTS

| | | | |
|---|---|---|---|
| 6,876,543 B2 | 4/2005 | Mockridge et al. | |
| 6,967,833 B2 | 11/2005 | Boykin et al. | |
| 6,999,826 B1 | 2/2006 | Zhou et al. | |
| 7,330,122 B2 | 2/2008 | Derrick et al. | |
| 7,342,792 B2 | 3/2008 | Kim et al. | |
| 7,369,191 B2 | 5/2008 | Okamoto et al. | |
| 7,522,889 B2 | 4/2009 | Wulff et al. | |
| 7,535,547 B2 | 5/2009 | Tannas, Jr. | |
| 7,545,574 B2 | 6/2009 | Park et al. | |
| 2002/0037686 A1 | 3/2002 | Brown et al. | |
| 2002/0048148 A1 | 4/2002 | Horiuchi et al. | |
| 2003/0197111 A1 | 10/2003 | Morimoto et al. | |
| 2005/0069667 A1 | 3/2005 | Wacker | |
| 2006/0082956 A1 | 4/2006 | Garel et al. | |
| 2006/0268528 A1 | 11/2006 | Zadesky et al. | |
| 2007/0165373 A1 | 7/2007 | Merz et al. | |
| 2008/0026614 A1 | 1/2008 | Emerson et al. | |
| 2008/0237477 A1 | 10/2008 | Hoggatt et al. | |
| 2009/0088055 A1 | 4/2009 | Silva et al. | |
| 2009/0146279 A1 | 6/2009 | Griffin | |
| 2009/0175001 A1 | 7/2009 | Mathew et al. | |
| 2009/0183819 A1 | 7/2009 | Matsuhira | |
| 2011/0043719 A1* | 2/2011 | Thunhorst et al. | 349/58 |

FOREIGN PATENT DOCUMENTS

| | | | |
|---|---|---|---|
| EP | 0 911 717 B1 | | 3/2003 |
| EP | 1 621 967 | | 2/2006 |
| JP | 62035107 A | * | 2/1987 |
| JP | 2003-174492 | | 6/2003 |
| JP | 2009158755 A | * | 7/2009 |
| WO | WO 2009/126480 | | 10/2009 |

OTHER PUBLICATIONS

JP 2009-158755 A English machine translation.*

Block, "MacBook Air Review", http://www.engadget.com/2008/01/25/Marcbook-air-review, Jan. 25, 2008.

PowerBook G4 (15-Inch FW 800): Sound Specifications, http://support.apple.com/kb/TA27151?viewlocale=en_US, Jan. 8, 2007.

Int'l Search Report dated May 10, 2011 from Int'l Application No. PCT/US2010/052563.

Written Opinion dated May 10, 2011 from Int'l Application No. PCT/US2010/052563.

Partial Search Report dated Feb. 15, 2011 from Int'l Application No. PCT/US2010/052563.

* cited by examiner

SELF FIXTURING ASSEMBLY TECHNIQUES

CROSS REFERENCE TO RELATED APPLICATIONS

This patent application is related to and incorporates by reference in their entireties for all purposes the following co-pending patent applications filed concurrently herewith:
(i) U.S. patent application Ser. No. 12/580,914 entitled "PORTABLE COMPUTER DISPLAY HOUSING" by Bergeron et al., now U.S. Pat. No. 8,233,109;
(ii) U.S. patent application Ser. No. 12/580,985 entitled "PORTABLE COMPUTER ELECTRICAL GROUNDING AND AUDIO SYSTEM ARCHITECTURES" by Thomason et al.;
(iii) U.S. patent application Ser. No. 12/580,946 entitled "PORTABLE COMPUTER HOUSING" by Casebolt et al.;
(iv) U.S. patent application Ser. No. 12/580,934 entitled "METHOD AND APPARATUS FOR POLISHING A CURVED EDGE" by Lancaster et al, that takes priority under 35 U.S.C. 119(e) to U.S. Provisional Patent Application Ser. No. 61/249,200 entitled "COMPLEX GEOGRAPHICAL EDGE POLISHING" by Johannessen filed Oct. 6, 2009 and incorporated by reference in its entirety;
(v) U.S. patent application Ser. No. 12/580,922 entitled "COMPUTER HOUSING" by Raff et al., now U.S. Pat. No. 8,111,505;
(vi) U.S. patent application Ser. No. 12/580,976 entitled "BATTERY" by Coish et al., now U.S. Pat. No. 8,199,469, which is a continuation in part of U.S. patent application Ser. No. 12/549,570 filed Aug. 28, 2009;
(vii) U.S. patent application Ser. No. 12/580,886 entitled "PORTABLE COMPUTER DISPLAY HOUSING" by Bergeron et al.; and
(viii) U.S. patent application Ser. No. 12/580,927 entitled "COMPUTER HOUSING" by Raff et al., now U.S. Pat. No. 8,199,468.

BACKGROUND OF THE INVENTION

1. Field of the Invention

The described embodiments relate generally to manufacturing assembly operations. More particularly, the present embodiments relate to joining computer sub-assemblies together that is both operationally efficient as well as preserves the aesthetic aspects.

2. Description of the Related Art

The outward appearance of a portable computing device, including its design and its heft, is important to a user of the portable computing device, as the outward appearance contributes to the overall impression that the user has of the portable computing device. At the same time, the assembly of the portable computing device is also important to the user, as a durable assembly will help extend the overall life of the portable computing device and will increase its value to the user.

One design challenge associated with the portable computing device is the design of the enclosures used to house the various internal components. This design challenge generally arises from a number conflicting design goals that includes the desirability of making the enclosure lighter and thinner, the desirability of making the enclosure stronger and making the enclosure more esthetically pleasing. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, increased weight may lead to user dissatisfaction, and bowing may damage the internal parts.

Furthermore, in most portable computing devices, the enclosures are mechanical assemblies having multiple parts that are screwed, bolted, riveted, or otherwise fastened together at discrete points. For example, the enclosures typically have included an upper casing and a lower casing that are placed on top of one another and fastened together using screws. These techniques typically complicate the housing design and create aesthetic difficulties because of undesirable cracks, seams, gaps or breaks at the mating surfaces and fasteners located along the surfaces of the housing. For example, a mating line surrounding the entire enclosure is produced when using an upper and lower casing. Not only that, but assembly is often a time consuming and cumbersome process. For example, the assembler has to spend a certain amount of time positioning the two parts and attaching each of the fasteners. Furthermore, assembly often requires the assembler to have special tools and some general technical skill.

Another challenge is in techniques for mounting structures within the portable computing devices. Conventionally, the structures have been laid over one of the casings (upper or lower) and attached to one of the casings with fasteners such as screws, bolts, rivets, etc. That is, the structures are positioned in a sandwich like manner in layers over the casing and thereafter fastened to the casing. This methodology suffers from the same drawbacks as mentioned above, i.e., assembly is a time consuming and cumbersome.

Therefore, it would be beneficial to provide a housing for a portable computing device that is aesthetically pleasing and lightweight, durable and yet environmentally friendly. It would also be beneficial to provide operationally efficient methods for mounting computer sub-assemblies to the housing that preserves the aesthetic look and feel of the housing.

SUMMARY OF THE DESCRIBED EMBODIMENTS

This paper describes various embodiments that relate to systems, methods, and apparatus for mounting computer sub-assemblies to a lightweight, visually seamless housing suitable for use in portable computing applications.

A self-fixturing method for bonding at least two workpieces together is described. The method can be carried out by performing at least the following operations. Forming a first bond between the two workpieces using a first adhesive, having a first cure time and self-fixturing the two workpieces together by bonding the two workpieces together using a second adhesive having a second cure time substantially shorter than the first cure time. In the described embodiment, the second bond is independent of the first bond and enables the self-fixtured workpieces to undergo processing that would otherwise occur only after the first adhesive has cured.

In one aspect, a first one of the workpieces is a plastic computer housing having at least a top cover and formed of a plastic material such as PCABS. A second workpiece is a metal frame formed of magnesium or magnesium alloy having a plurality of attachment features that can take the form of holes in the metal frame. The metal frame providing support for internal components of a computer assembly placed in the computer housing. The first adhesive can be an epoxy having a cure time of about 12-24 hours and the second adhesive can be a UV cure glue having a cure time of about 5 seconds.

In one embodiment, a method for joining a first and second workpiece together is described. The method can be performed by carrying out at least the following operations. Applying a first adhesive to the first workpiece or the second workpiece at an application region, the first adhesive having an associated first cure time; placing the first and the second workpiece in contact with each other at the application region; applying an externally generated compression force to the first and the second workpieces; applying a second adhesive to at least one of the first and second workpieces at an attachment feature, the second adhesive having an associated cure time substantially less than the first cure time; curing the second adhesive; and removing the externally generated compression force.

Computer readable medium encoded with computer program executed by a processor for controlling a manufacturing process for joining a first and second workpiece together is described. The computer readable medium including computer code for applying a first adhesive to the first workpiece or the second workpiece at an application region, the first adhesive having an associated first cure time; computer code for placing the first and the second workpiece in contact with each other at the application region; computer code for applying an externally generated compression force to the first and the second workpieces; computer code for applying a second adhesive to at least one of the first and second workpieces at an attachment feature, the second adhesive having an associated cure time substantially less than the first cure time; computer code for curing the second adhesive; and computer code for removing the externally generated compression force.

Other aspects and advantages of the described embodiments will become apparent from the following detailed description taken in conjunction with the accompanying drawings which illustrate, by way of example, the principles of the described embodiments.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The following relates to a process, apparatus, and system for joining at least two work pieces together using at least two adhesives each having substantially different cure times. In one embodiment, a first adhesive can have an associated first cure time and a second adhesive can have an associated second cure time that is substantially shorter in duration than the first cure time. For example, the first adhesive can take the form of an epoxy such as LOCTITE® H8000™ having a structural cure time of about 24 hours at room temperature (i.e., about 25° C.) whereas the second adhesive can take the form of a UV cure type adhesive such as LOCTITE® 3106™ having a cure time of about 3-10 seconds to about 30 seconds when exposed to UV light having wavelength in the range of about 280-395 nm. The second adhesive can act to self fixture the first and second work pieces together as a single piece that can immediately undergo subsequent processing without the need for an external fixturing device. In this way, at least an amount of time approximately equal to the difference between the first and second cure times can be saved from the overall processing time.

These and other embodiments are discussed below with reference to FIGS. 1-7. However, those skilled in the art will readily appreciate that the detailed description given herein with respect to these figures is for explanatory purposes as the full extent of the embodiments goes beyond the embodiments described in this paper.

Figure 1:
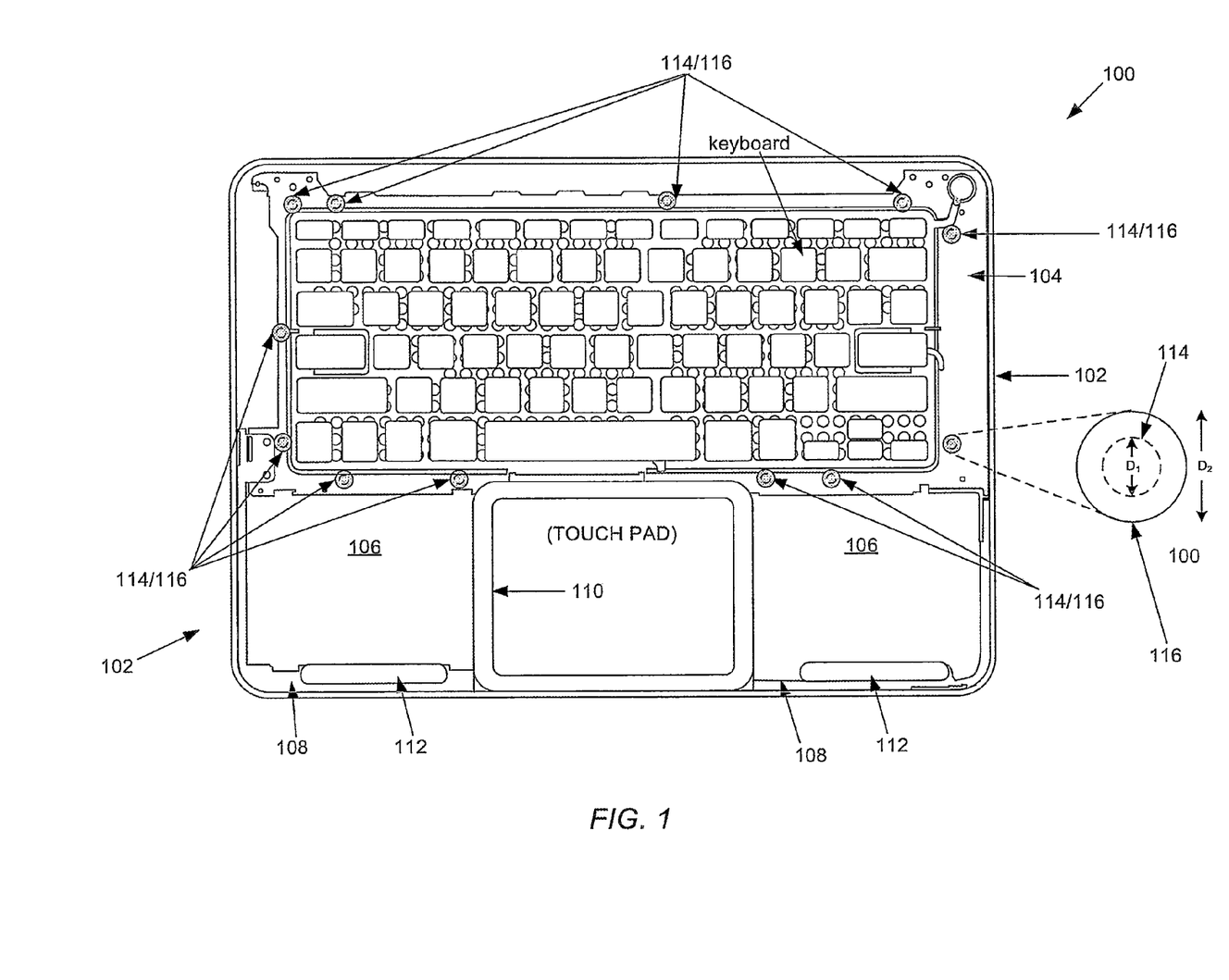
FIG. 1 shows how in one embodiment describing computer top cover in accordance with the described embodiments.

FIG. 1 shows how in one embodiment describing computer top cover 100, a first workpiece can take the form of computer housing 102 and a second workpiece can take the form of metal frame 104 bonded to interior surface 106 of computer housing 102. In the described embodiment, computer top cover 100 can be part of a portable, lightweight yet sturdy portable computing system, such as a laptop computer. In order to keep the overall weight of the portable computing system at a minimum, housing 102 can be formed of lightweight and resilient material along the lines of PCABS. However, due to the relative fragility of any computer housing composed solely of plastic, even plastic as rugged as PCABS, additional structural support can be provided. The additional structural support for top cover 100 can be provided by, for example, front frame 108. Support for a user interface such as a touch pad can be provided by touch pad frame 110 that can be formed of a metal such as aluminum, magnesium, or any alloys thereof. Attraction plates 112 can be used in conjunction with magnets to secure a lid to top cover 100 when the lid is placed in a closed position.

Rear frame 104 can provide support for a rear portion of housing 102 as well as, in some embodiments, a user interface such as a keyboard (shown in silhouette). Rear frame 104 can also act as a platform onto which a number of internal components such as a main logic board, or MLB, optical disk drive, or ODD, and so on can be mounted. Rear frame 104 can be formed of lightweight and strong material along the lines of aluminum, magnesium, or any alloy thereof. In the described embodiment, rear frame 104 and housing 102 can be bonded together using a self fixturing technique in accordance with the described embodiments. For example, to form a first bond, a first adhesive (such as epoxy) having a first cure time can be applied to an inside surface of rear frame 104. However securing together housing 102 and rear frame 104 using a conventional bonding technique requires that both rear frame 104 and housing 102 be placed in a compression fixture at least until the first adhesive has cured. In this way, rear frame 104 and housing 102 cannot be removed from the compression fixture for further processing at least until after the first adhesive has cured wasting valuable processing time that could otherwise be used for subsequent processing. It should also be noted that compressing housing 102 for any appreciable length of time can also cause deformations and warping in top cover 100.

However, using a self fixturing technique in accordance with the described embodiments, the operational inefficiencies and potential product damage associated with a conventional bonding approach can be essentially eliminated. For example, while the rear frame 104 and housing 102 are still in the compression fixture, a second, or self fixturing, bond that is independent of the first bond can be formed between rear frame 104 and housing 102. The fixturing bond can be formed using a second adhesive having a shorter cure time than the first adhesive. The fixturing bond can be formed by applying a second adhesive at any of a number of attachment features 114 located in rear frame 104. In the described embodiment attachment features 114 can take the form of perforations along the lines of circular holes each having diameter $D_1$ being a size that allows a sufficient amount of surface 106 to be wetted by the second adhesive passing through attachment feature 114. The second adhesive can cure in a period of time much less than the time required for the first adhesive to cure and can form semi-spherical-like plugs 116 each having a diameter $D_2$ that can be greater than diameter $D_1$. In this way, the bond formed by the second adhesive can quickly secure rear frame 104 and housing 102 while still in the compression fixture. However, once the fixturing bond is created, rear frame 104 and housing 102 can be immediately removed from the compression fixture without fear of disturbing the curing of the first adhesive. Moreover, the tight fit and unyielding nature of plugs 116 can help to maintain the compressive force (i.e., sometimes referred to as being "frozen into place") between rear frame 104 and housing 102 even after being removed from the compression fixture.

Figure 2:
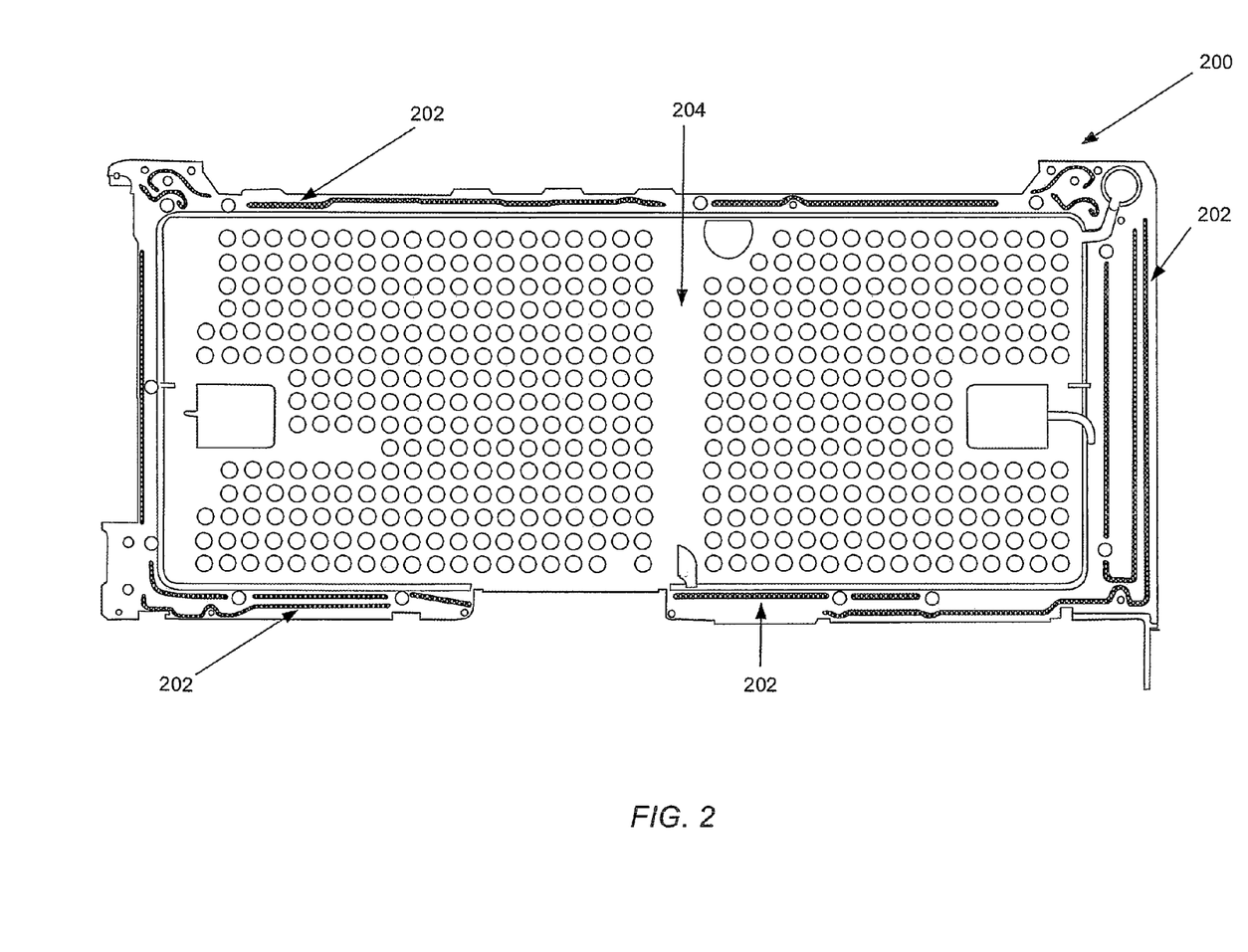
FIG. 2 shows rear frame in accordance with the described embodiments
Figure 3:
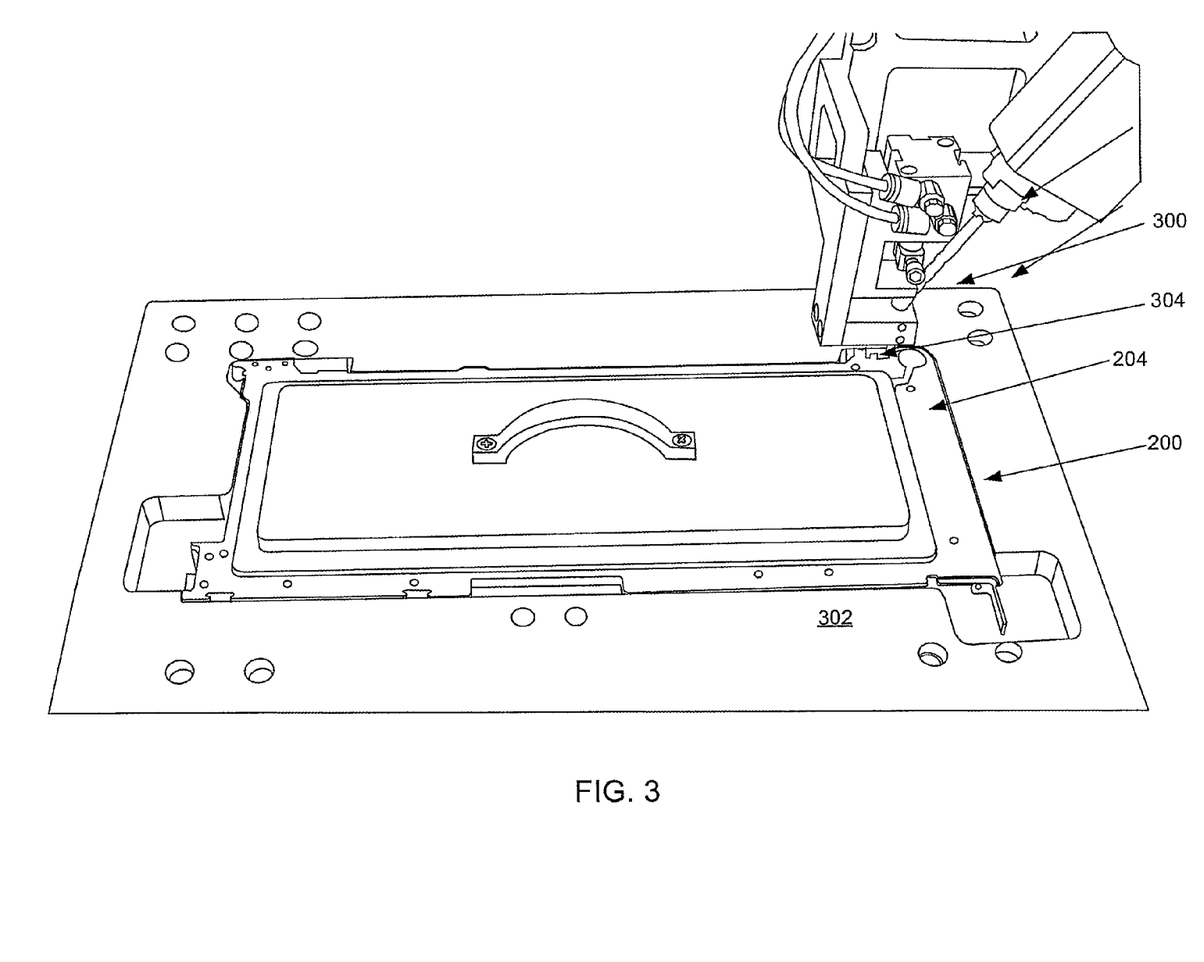
FIG. 3 shows representative example of first adhesive applied to rear frame.

A particular embodiment will now be described with reference to FIGS. 2-6. More specifically, FIG. 2 shows rear frame 200 in accordance with the described embodiments. In particular, FIG. 2 illustrates a particular approach to applying the first adhesive in the form of epoxy 202 to interior surface 204 of rear frame 200. Epoxy 202 can take the form of a two part type epoxy along the lines of LOCTITE® H8000™ manufactured by Henkel AG & Co. of Dusseldorf, Germany having a cure time at 25° C. of about one hour. Epoxy 202 can be applied to interior surface 204 in any number of ways. For example, as shown in FIG. 3, epoxy 202 can be applied to rear frame 200 by way of dispenser unit 300. Rear frame 200 can be placed on platen 302 having interior surface 204 facing epoxy dispenser nozzle 304. The position of epoxy dispenser nozzle 304 can be automatically controlled by, for example, a computer. In this way, epoxy 202 can be applied in any manner and in any amount and in any location on interior surface 204 deemed appropriate to achieve the most effective bond between rear frame 200 and housing 102.

Figure 4:
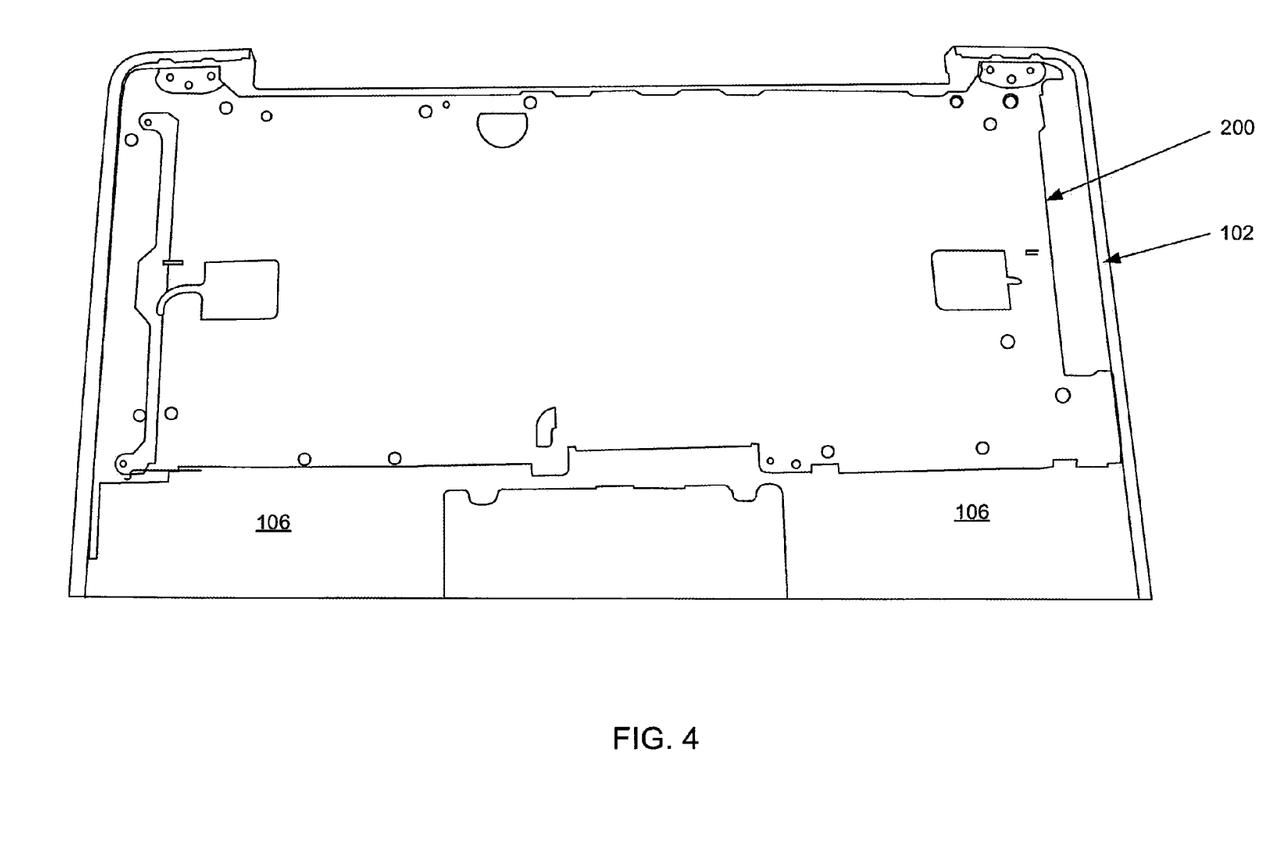
FIG. 4 shows rear frame placed in contact with computer housing prior to insertion into compression fixture.
Figure 5:
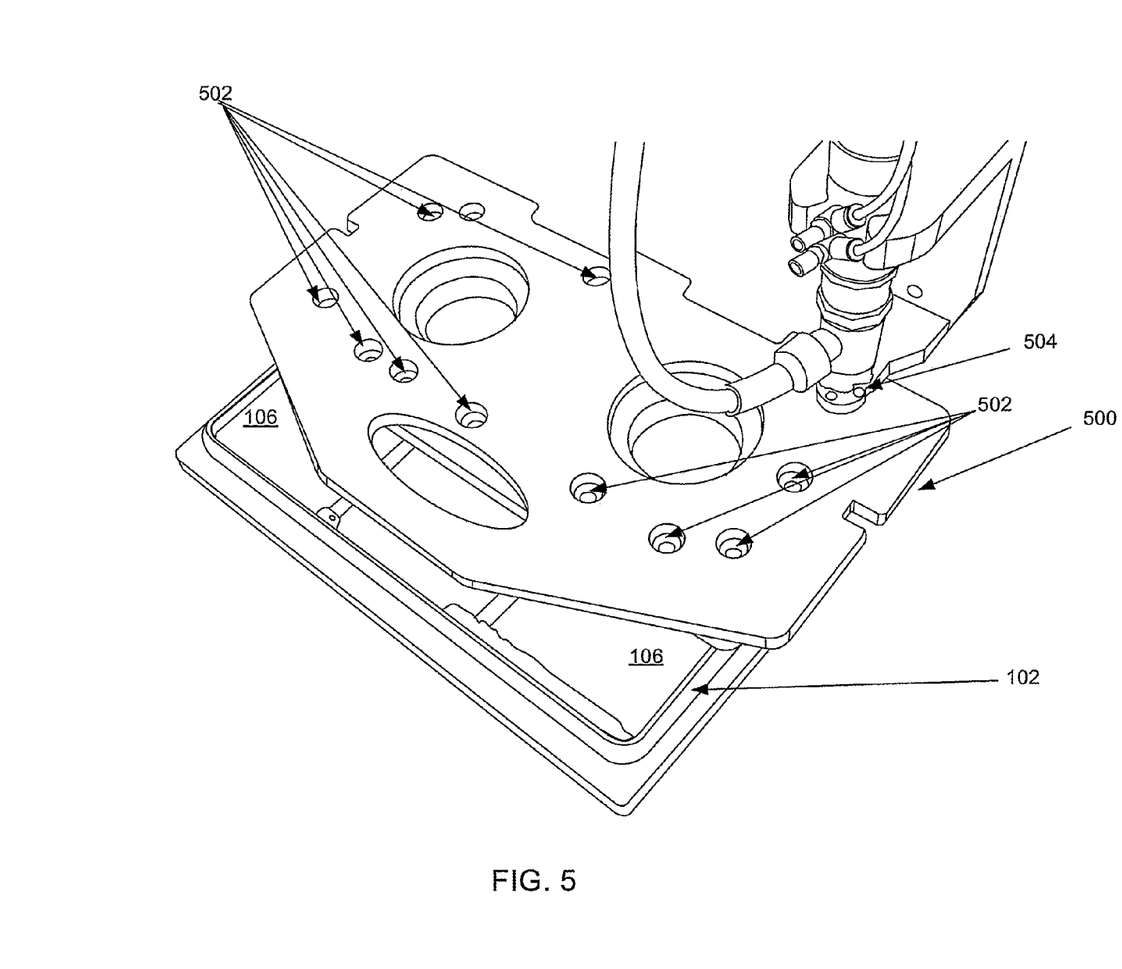
FIG. 5 shows rear frame and computer housing in compression fixture and UV glue applicator in accordance with the described embodiments.

Once epoxy 202 is properly applied to surface 204, rear frame 200 can be removed from epoxy dispensing unit 300 and placed "epoxy side" down onto surface 106 as shown in FIG. 4. Once rear frame 200 and housing 102 are in proper placement, rear frame 200 and housing 102 can be placed into compression fixture 500 as illustrated in FIG. 5. In the described embodiment, compression fixture 500 can generate compression force $C_F$ that can be applied by compression fixture 500 to housing 102 and rear frame 200. In this way, compression force $C_F$ can squeeze epoxy 202 between housing 102 and rear frame 104 causing epoxy 202 to wet out.

Figure 6:
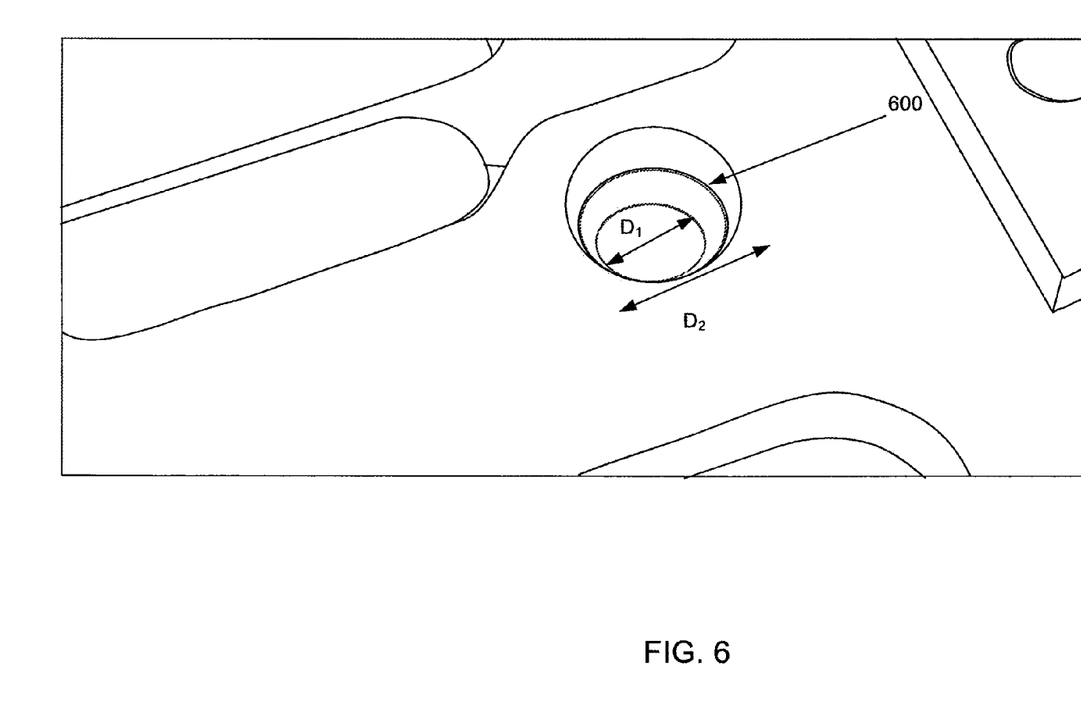
FIG. 6 shows a representative plug created by cured UV glue.

While still in compression fixture 500 and with attachment features 114 accessible via access holes 502, second adhesive in the form of UV glue along the lines of LOCTITE® 3106™ can be applied by dispenser unit 504 through access holes 502 each associated with a specific one of attachment features 114. Once the second adhesive is applied, compression fixture 500, housing 102 and rear frame 200 can be placed in a UV cure system that can generate UV light in the range of about 280-395 nm. In this way, the UV glue can cure in about 5 seconds forming plug 600 an example of which is shown in FIG. 6. In this way, housing 102 and rear frame 200 are essentially locked, or frozen, into place such that epoxy 202 can still remain in a compressed state being held between housing 102 and rear frame 200 even though removed entirely from compression fixture 500. Once removed, the housing 102 and rear frame 200 (now essentially in the form of top cover 100) can undergo subsequent processing that would otherwise have to wait for epoxy 202 to cure (which in this case could be as long as one hour). Accordingly, any need for ovens to cure epoxy 202 can be eliminated and the overall time to process top cover 100 can be reduced by at least the amount of time heretofore wasted waiting for epoxy 202 to cure.

Figure 7:
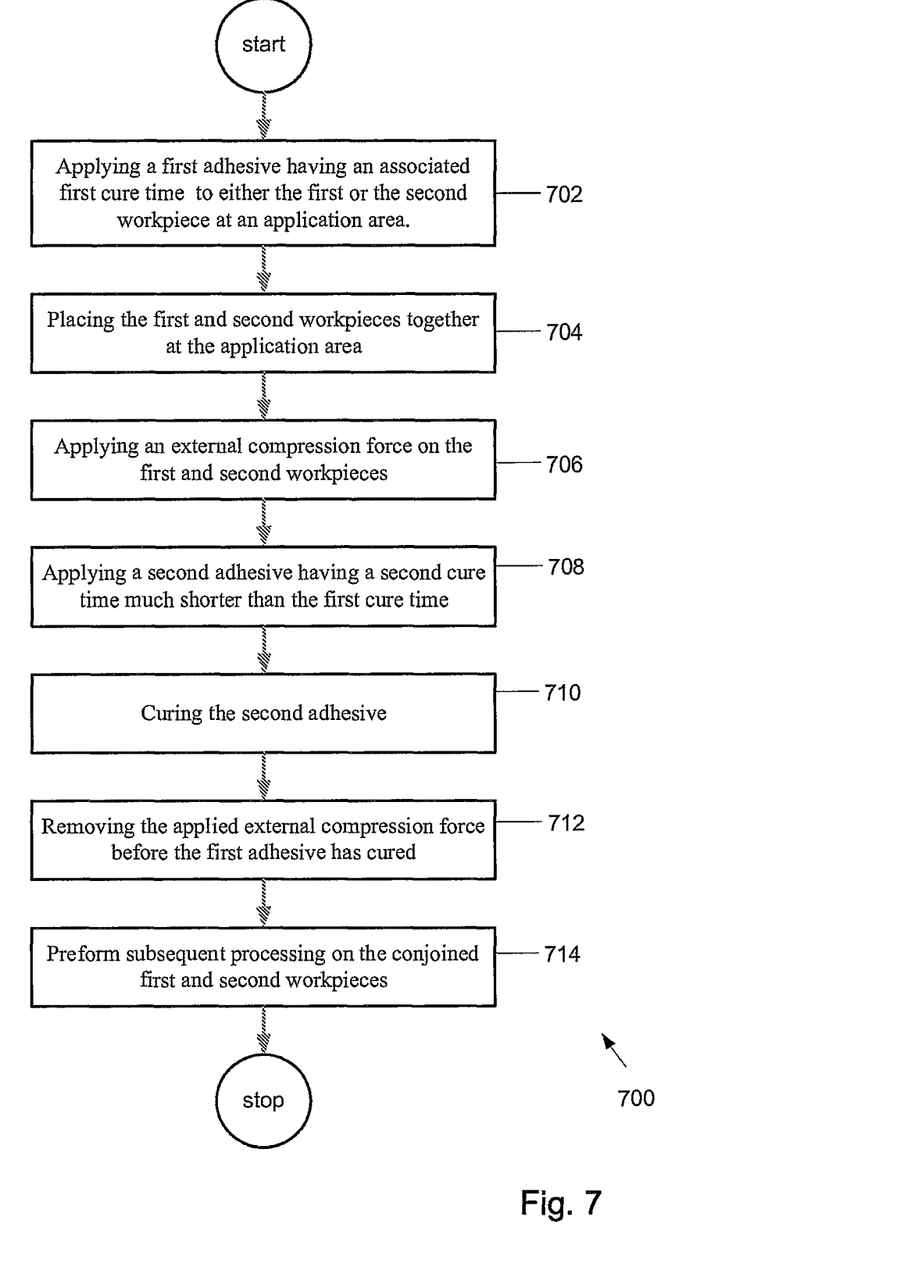
FIG. 7 shows a flowchart detailing a process in accordance with the embodiments.

FIG. 7 shows a flowchart of process 700 in accordance with the described embodiments. Process 700 can be used to fabricate assemblies in a cost effective and efficient manner. In particular, the process describes in part the joining of at least two work pieces by adhesives having substantially different cure times, a primary adhesive having a longer cure time than a secondary adhesive. The primary adhesive providing the primary bond between the two workpieces and the secondary adhesive providing a self fixturing function as well as providing additional bond strength to the primary bond. The self fixturing effectively allowing the assembly of the joined workpieces to continue with post joining operations which heretofore had to wait at least until the primary adhesive cured. Process 700 can be carried out by performing at least the following operations. At 702, a first adhesive having an associated first cure time can be applied to either a first or a second workpiece at an application area. In the described embodiment, the first adhesive can take the form of a two part epoxy having a cure time in the range of a few hours.

At 704, the first and second workpieces can be placed in contact with each other at the application area. In this way, the first adhesive can make contact with both the first and the second workpiece. Next, at 706, an externally generated compression force is applied to both the first and second workpieces. In this way, the first adhesive can properly "wet up" between the first and second workpieces so as to at least remove any voids and so on that could have an adverse affect on the bond formed. At 708, a second adhesive having a second cure time that is shorter than the first cure time is applied such that the second adhesive comes in contact with both the first and the second workpieces. It should be noted that the application of the second adhesive can take place while the externally generated compression force is still being applied to the first and the second workpieces. In the described embodiment, the second adhesive can take the form of a UV cure glue having a cure time of about 10 seconds.

At 710, the second adhesive is cured. For example, if the second adhesive is a UV cure glue (such as LOCTITE® 3106™ manufactured by Henkel AG & Co. of Dusseldorf, Germany), then the first and second workpieces can be placed in a UV cure system for at least the amount of time required to cure the second adhesive (about 5 seconds under UV light of about 280-395 nm). Once the second adhesive has fully cure, the externally generated compression force can be removed at 712 and at 714 the conjoined (by virtue of the second bond formed by the cured second adhesive) first and second workpieces can undergo subsequent processing that would otherwise have to wait until at least the first adhesive had cured.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling assembly operations or as computer readable code on a computer readable medium for controlling a manufacturing line used to fabricate housings. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

What is claimed is:

1. A self-fixturing method for bonding a metal frame to an electronic device housing, comprising:
    receiving the metal frame, the metal frame having at least a first part of a permanent attachment feature mold used to form a permanent attachment feature used to bond the metal frame to the electronic device housing, the permanent attachment feature mold comprising a semi-spherical cross-sectional perforation having a diameter D1 at a first surface of the metal frame and a diameter D2 at a second surface of the metal frame wherein D2 is greater than D1;
    applying a thermal cure epoxy adhesive on a portion of the first surface of the metal frame;
    placing the first surface of the metal frame in contact with a first surface of an electronic device housing;
    compressing the metal frame and electronic device housing together using at least a compression force C1; and
    forming the permanent attachment feature by,
        injecting an amount of UV cure adhesive into the permanent attachment feature mold at the second surface that does not overfill the permanent attachment feature mold thereby allowing the permanent attachment feature to remain below the level of the second surface of the metal frame, and
        curing the UV cure adhesive by exposing the amount of UV cure adhesive in the permanent attachment feature mold to UV light.

2. The self-fixturing bonding method as recited in claim 1, wherein the cure time of the thermal cure epoxy adhesive is about 24 hours at about 25 degrees Celsius.

3. The self-fixturing bonding method as recited in claim 2, wherein the UV cure adhesive has a cure time of about 5 seconds.

4. The self-fixturing bonding method as recited in claim 1, wherein the plug constrains the metal frame and the electronic device housing such that the metal frame and the electronic device housing are maintained under a compressive force applied prior to the application of the UV cure adhesive after compression force C1 is removed.

5. A method for joining a metal frame and an electronic device housing together, comprising:
    applying a thermal cure epoxy adhesive to the metal frame at an application region, the thermal cure epoxy adhesive having an associated first cure time;
    placing the metal frame and the electronic device housing in contact with each other at the application region;
    applying an externally generated compression force to the metal frame and the electronic device housing;
    applying a UV cure adhesive having an associated second cure time shorter than the first cure time to the metal frame at a permanent attachment feature mold, the permanent attachment feature mold comprising:
        a semi-spherical cross-sectional perforation having a diameter D1 at a first surface of the metal frame and a diameter D2 at a second surface of the metal frame wherein D2 is greater than D1, and further wherein the UV cure adhesive applied to the permanent attachment feature mold does not overfill the permanent attachment feature mold thereby allowing the UV cure adhesive to remain below the level of the second surface of the metal frame;
    curing the UV cure adhesive; and
    removing the externally generated compression force.

6. The method as recited in claim 5, further comprising:
    further processing of the conjoined metal frame and electronic device housing immediately after the externally generated compression force is removed.

7. The method as recited in claim 5, wherein the permanent attachment feature mold comprises:
    a perforation sized to accept an amount of the UV cure adhesive sufficient to wet both the metal frame and the electronic device housing.

8. The method as recited in claim 7, wherein when the UV cure adhesive cures, the cured UV cure adhesive forms an attachment feature, the attachment feature acting to secure the metal frame and the electronic device housing independent of the bond formed by the thermal cure epoxy adhesive.

9. The method as recited in claim 5, wherein the thermal cure epoxy adhesive is a two part epoxy having a cure time of about 1 hour at room temperature and wherein the UV cure adhesive is a UV cure glue having a cure time of about 10 seconds when exposed to UV light of an appropriate wavelength.

* * * * *

UNITED STATES PATENT AND TRADEMARK OFFICE
CERTIFICATE OF CORRECTION

PATENT NO.        : 8,333,862 B2
APPLICATION NO.   : 12/580881
DATED             : December 18, 2012
INVENTOR(S)       : Peter M. Thompson et al.

It is certified that error appears in the above-identified patent and that said Letters Patent is hereby corrected as shown below:

In the Claims

In claim 4, column 8, line 5, delete "wherein the plug" and insert -- wherein a plug --

In claim 4, column 8, line 8, delete "the application" and insert -- an application --

Signed and Sealed this
Second Day of July, 2013

Teresa Stanek Rea
*Acting Director of the United States Patent and Trademark Office*